United States Patent [19]

Werkhoff et al.

[11] 4,308,291
[45] Dec. 29, 1981

[54] PROCESS FOR DECAFFEINATING GREEN COFFEE

[75] Inventors: Peter Werkhoff, Stuhr; Peter Hubert, Bremen, both of Fed. Rep. of Germany

[73] Assignee: Hag Aktiengesellschaft, Bremen, Fed. Rep. of Germany

[21] Appl. No.: 100,615

[22] Filed: Dec. 5, 1979

[30] Foreign Application Priority Data

Dec. 8, 1978 [DE] Fed. Rep. of Germany ....... 2853169

[51] Int. Cl.³ .............................................. A23F 5/20
[52] U.S. Cl. .................................... 426/428; 544/274
[58] Field of Search ............... 426/427, 428, 429, 430; 544/274

[56] References Cited

U.S. PATENT DOCUMENTS 4,256,774  3/1981  Strobel ............................... 426/428

OTHER PUBLICATIONS

Chemical Abstracts, vol. 90, 1979, 90:150499s; 90:150500k.

*Primary Examiner*—Joseph M. Golian
*Attorney, Agent, or Firm*—Sughrue, Mion, Zinn, Macpeak and Seas

[57] ABSTRACT

A process for decaffeinating green coffee comprising treating green coffee with at least one acetal of the general formula

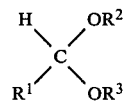

wherein $R^1$ is a hydrogen atom or a methyl group and $R^2$ and $R^3$ are each a methyl group or an ethyl group, as an organic solvent, and removing solvent residues by steaming the treated green coffee.

6 Claims, No Drawings

PROCESS FOR DECAFFEINATING GREEN COFFEE

BACKGROUND OF THE INVENTION

1. Field of the Invention

The invention relates to a process for decaffeinating green coffee, optionally pre-moistured with water or steam, by treatment with organic solvents and removal of the solvent residues by steaming.

2. Description of the Prior Art

In decaffeinating green coffee, a solvent is required which extracts caffeine with high selectivity, i.e. which does not extract also other coffee ingredients. Moreover, the solvent employed must be removable completely from the treated coffee.

Most known processes for decaffeinating green coffee employ halogen-containing hydrocarbons such as trichloroethylene, dichloroethane or chloroform on account of the selective dissolving capability of these solvents for caffeine. The use of the solvents, however, recently has given rise to objections under the aspect of health.

In other known processes esters, ketones, light hydrocarbons or ethers have been employed. However, esters are readily saponified, and it is difficult to sufficiently remove saponification products, i.e. acids and alcohols, from the coffee. Due to their relatively high polarity ketones have insufficient selectivity for removal of caffeine. Hydrocarbons and ethers dissolve caffeine only sparingly so that relatively high temperatures and long treating periods must be employed when these solvents are used.

SUMMARY OF THE INVENTION

The invention provides a process for decaffeinating green coffee with an organic solvent which exhibits high selectivity for caffeine and can be easily and substantially completely removed from the decaffeinated coffee by steaming.

More specifically, this invention provides a process for decaffeinating green coffee comprising treating green coffee with at least one acetal of the general formula

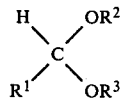

wherein $R^1$ is a hydrogen atom or a methyl group and $R^2$ and $R^3$ are each a methyl group or an ethyl group, as an organic solvent, and removing solvent residues by steaming the treated green coffee. The green coffee can be optionally premoistened with water or steam prior to treatment.

DETAILED DESCRIPTION OF THE INVENTION

The acetals used according to the invention of the general formula above surprisingly exhibit high selectivity for caffeine, which could not be expected in view of their polarity and partially also water solubility. At the same time they dissolve the undesirable wax coats on the green coffee bean which result in so-called undesired stimulants during roasting. After decaffeination the acetals used according to the invention may be easily removed from the coffee beans by steaming. Preferred acetals are 1,1-dimethoxymethane, 1,1-diethoxymethane, and 1,1-dimethoxyethane.

The green coffee subjected to the decaffeination treatment of this invention may have been pre-moistened with water or steam in a manner known per se to provide a water content of from about 20 to 50% by weight, based on the total weight of coffee plus water. However, also non-premoistened green coffee may be used if the water content of the acetal employed is increased accordingly.

During the decaffeination, the water content of the coffee should remain unchanged to ensure a constant decaffeination rate. This may be accomplished by the following procedures:

(a) adding water to the acetal;

(b) operating at low temperatures (which is equivalent to reducing the capacity of the acetal solvent to dissolve water);

(c) adding a component which does not dissolve water or dissolves it to only a slight extent, while not affecting the selectivity for caffeine removal.

In acidic medium some acetals tend to saponify forming an adehyde and an alcohol. In particular, the alcohol is then bound in the green coffee to such an extent that it is only incompletely removed during the subsequent steaming treatment. In order to avoid cleavage of the acetal, in the invention an ortho-formate, such as a lower alkyl ester, especially trimethyl or triethyl ortho-formate or dimethyl carbonate, is added to the acetals. These additives simultaneously have the desirable effect of reducing the water solubility of the system. A suitable amount of such an additive used to avoid acetal cleavage is about 2 to 10% by weight, preferably 6 to 8% by weight, based on the weight of the acetal.

1,1-Dimethoxymethane is especially preferred as an acetal for use in this invention. Also azeotropic mixtures of 1,1-dimethoxymethane with water (1.4% by weight), with isopentane (70% by weight), with 1-pentene (74% by weight), with pentane (72% by weight), with 2-pentene (71% by weight) and with cyclopentane (38% by weight) may be employed.

The temperature during decaffeination may range between about 20° and about 100° C. with the range between 20° C. and 50° C. being preferred, and with the range between 20° C. and 40° C. being especially preferred.

According to the water distribution coefficient between moist coffee and solvent and its dependence on temperature, adequate amounts of water are added to the solvent in order to maintain a constant water content in the coffee. Preferably the solvent is recycled through the coffee contained in an extraction vessel. The amount of solvent is such that the entire coffee bed is covered. The treating period normally ranges from about 1 to about 5 hours. On the whole the coffee is generally treated with 4 solvent charges. The solvent laden with caffeine and wax is recovered by distillation and the caffeine is isolated in pure form from the bottoms in a manner known per se. The treated coffee is freed from solvent residues by means of saturated steam of about 105° C. to 120° C. and thereafter subjected to drying, e.g., in a vacuum or with hot air.

The roasted coffee produced from the material treated in accordance with this invention does not differ from the starting coffee material, after roasting, either in appearance or in taste. It has been found, in some cases where low quality coffee beans were subjected to decaffeination according to the process of this invention, a refinement and improvement of the normally harsh taste could be achieved.

The following non-limiting examples are given to illustrate the process of this invention in greater detail.

EXAMPLE 1

100 kg of green coffee were steamed at 105° C. to a water content of 28%. Thereafter 200 liters of pure 1,1-dimethoxymethane mixed with 5% by weight water was added 4 times, and each charge was recycled through the coffee bed at 40° C. for a period of 1.5 hours. After separation of the solvent, the coffee was steamed with 30 kg of saturated steam at 105° C. per hour and then dried in a vacuum at 50° C. to 11% by weight residual moisture. Analysis of the starting material with the resulting product showed the following values:

|  | Roasted Coffee Treated (% by weight) | Roasted Coffee Untreated (% by weight) |
| --- | --- | --- |
| Caffeine Content | 0.06% | 1.24% |
| Extract Content | 26.3% | 27.7% |
| Trigonelline | 0.56% | 0.57% |
| Chlorogenic Acid | 3.2% | 3.1% |
| Carboxylic Acid (Hydroxy)- Tryptamide | 210 ppm | 520 ppm |

EXAMPLE 2

100 kg of green coffee hydrolyzed as described in Example 1 was treated four times in succession with 200 liters of 1,1-diethoxymethane each containing additionally 8% by weight dimethyl carbonate, each time for one hour at 60° C. After termination of the solvent treatment the coffee was steamed with saturated steam at 110° C. for 2.5 hours and thereafter dried. The properties and analytical data of the roasted treated coffee corresponded to those of the roasted treated coffee of Example 1.

What is claimed is:

1. A process for decaffeinating green coffee comprising extracting green coffee with at least one acetal of the general formula

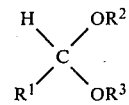

wherein $R^1$ is a hydrogen atom or a methyl group and $R^2$ and $R^3$ are each a methyl group or an ethyl group, as an organic solvent, and removing solvent residues by steaming the extracted green coffee.

2. The process according to claim 1, wherein the acetal is 1,1-dimethoxymethane, 1,1-diethoxymethane or 1,1-dimethoxyethane.

3. The process according to claim 1 or 2, wherein the acetal employed already contains an amount of water corresponding to the water distribution coefficient between the acetal and the moisture content of the green coffee at the extracting temperature.

4. The process according to claims 1 or 2, wherein the extracting of the green coffee with the acetal is at temperatures between room temperature and about 100° C.

5. The process according to claim 3, wherein the extracting of the green coffee with the acetal is at temperatures between room temperature and about 100° C.

6. The process according to claim 1, wherein the green coffee is pre-moistened with water or steam prior to extracting the green coffee with said at least one acetal.

* * * * *